(12) United States Patent
Hiroe

(10) Patent No.: US 10,715,690 B2
(45) Date of Patent: Jul. 14, 2020

(54) IMAGE PROCESSING APPARATUS AND IMAGE PROCESSING METHOD FOR DESIGNATING COLOR AND MONOCHROME IMAGES

(71) Applicant: TOSHIBA TEC KABUSHIKI KAISHA, Tokyo (JP)

(72) Inventor: Yoshihito Hiroe, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 17 days.

(21) Appl. No.: 16/274,000

(22) Filed: Feb. 12, 2019

(65) Prior Publication Data
US 2020/0036868 A1 Jan. 30, 2020

(30) Foreign Application Priority Data
Jul. 24, 2018 (JP) .................................. 2018-138493

(51) Int. Cl.
*H04N 1/00* (2006.01)
*H04N 1/48* (2006.01)
*G06F 3/12* (2006.01)

(52) U.S. Cl.
CPC ....... *H04N 1/00461* (2013.01); *G06F 3/1256* (2013.01); *H04N 1/00411* (2013.01); *H04N 1/482* (2013.01); *H04N 2201/0094* (2013.01)

(58) Field of Classification Search
None
See application file for complete search history.

(56) References Cited

U.S. PATENT DOCUMENTS

2008/0062483 A1* 3/2008 Morimoto ................ H04N 1/56
358/530

FOREIGN PATENT DOCUMENTS

JP 2004328444 A 11/2004

* cited by examiner

*Primary Examiner* — Barbara D Reinier
(74) *Attorney, Agent, or Firm* — Kim & Stewart LLP

(57) ABSTRACT

An image processing apparatus includes a processor configured to acquire an image and designate whether the image is a color image or a monochrome image based on a comparison of a feature quantity of the image and a threshold value. A storage unit stores the threshold value. A display unit displays whether the image has been designated a color image or a monochrome image by the processor. An input device is configured to receive user input for changing whether the image is designated a color image or a monochrome image. The processor changes the threshold value stored in the storage unit when the user input changes whether the image is designated a color image or a monochrome image.

20 Claims, 7 Drawing Sheets

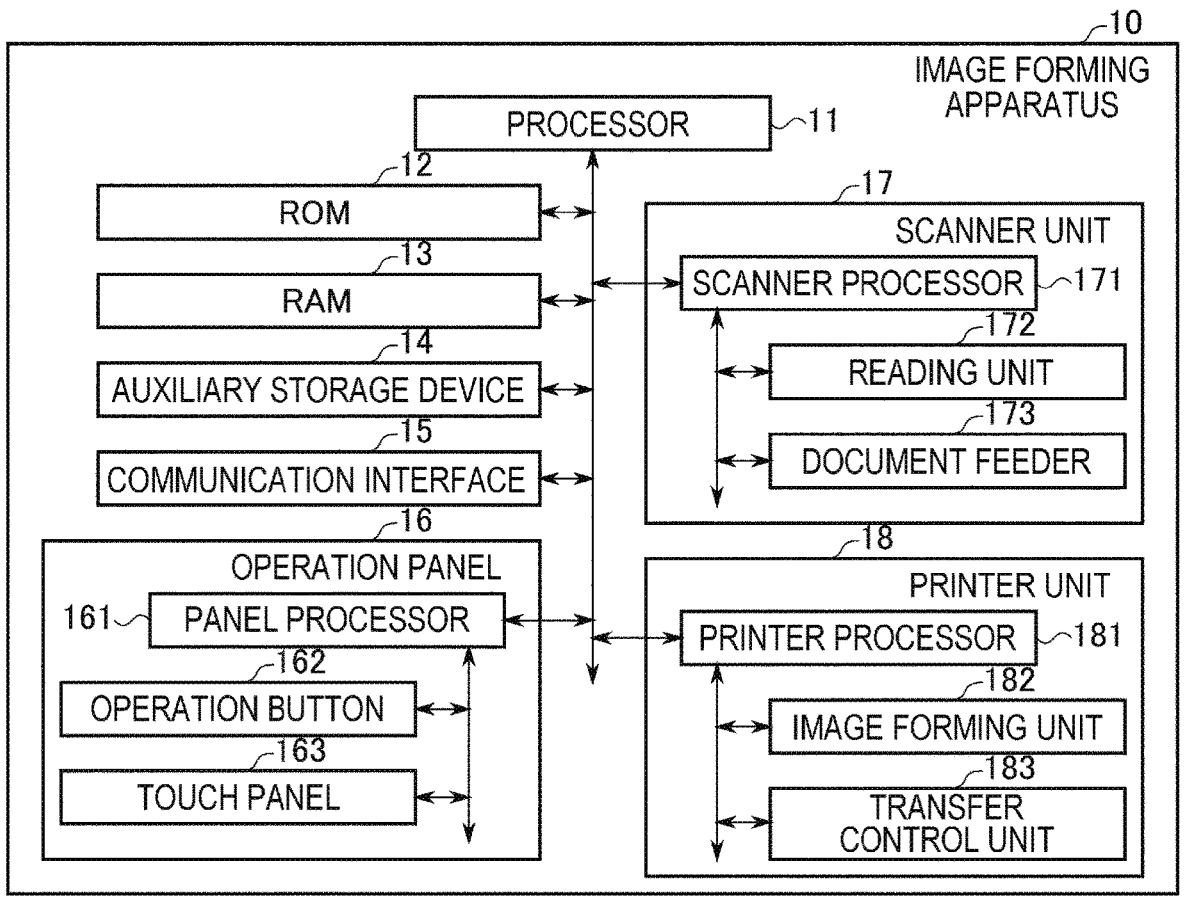

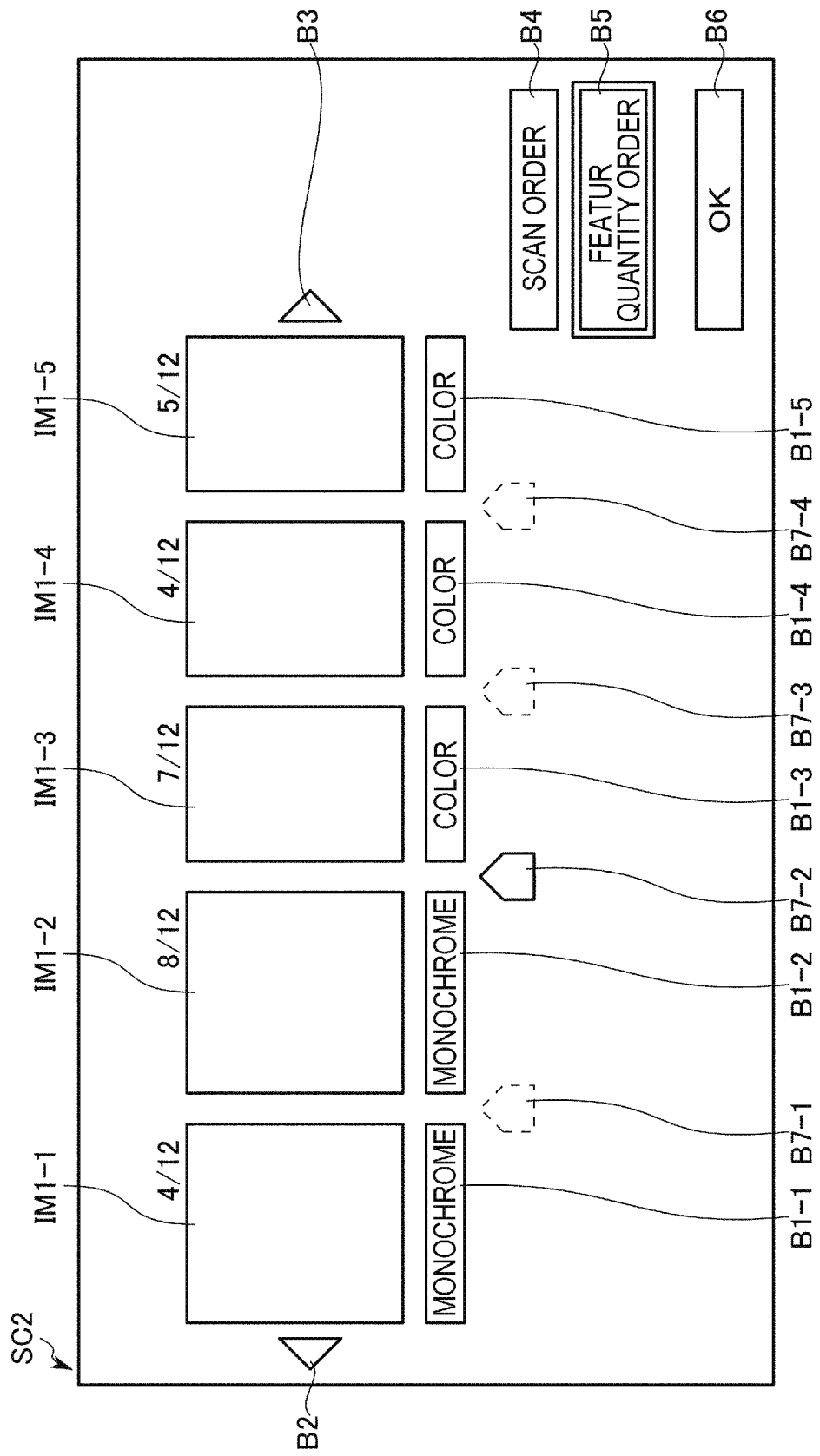

IMAGE PROCESSING APPARATUS AND IMAGE PROCESSING METHOD FOR DESIGNATING COLOR AND MONOCHROME IMAGES

CROSS-REFERENCE TO RELATED APPLICATIONS

This application is based upon and claims the benefit of priority from Japanese Patent Application No. 2018-138493, filed Jul. 24, 2018, the entire contents of which are incorporated herein by reference.

FIELD

Embodiments described herein relate generally to an image processing apparatus and an image processing method.

BACKGROUND

An image forming apparatus including an automatic color selection (ACS) function for determining whether an image read from a document is treated as a color image or a monochrome image is known. Such an image forming apparatus determines whether each pixel of image data of a page of the document is a color pixel and when the total number of pixels, or a ratio of color pixels to total pixels, is equal to or greater than a predetermined value, the image is treated as a color image. In such an image forming apparatus, it is necessary to set a reference value for determining whether an image is a color image or a monochrome image. If the color/monochrome image is not correctly determined by the ACS function, a user will have to adjust the reference value by trial and error. Therefore, adjustment(s) requiring user/operator intervention is necessary.

DESCRIPTION OF THE DRAWINGS

FIG. 1 depicts a circuit configuration of main parts of an image forming apparatus according to an embodiment.

FIG. 2 depicts a table stored in an auxiliary storage device.

FIG. 9 depicts an example of a screen displayed on a touch panel.

DETAILED DESCRIPTION

Figure 3:
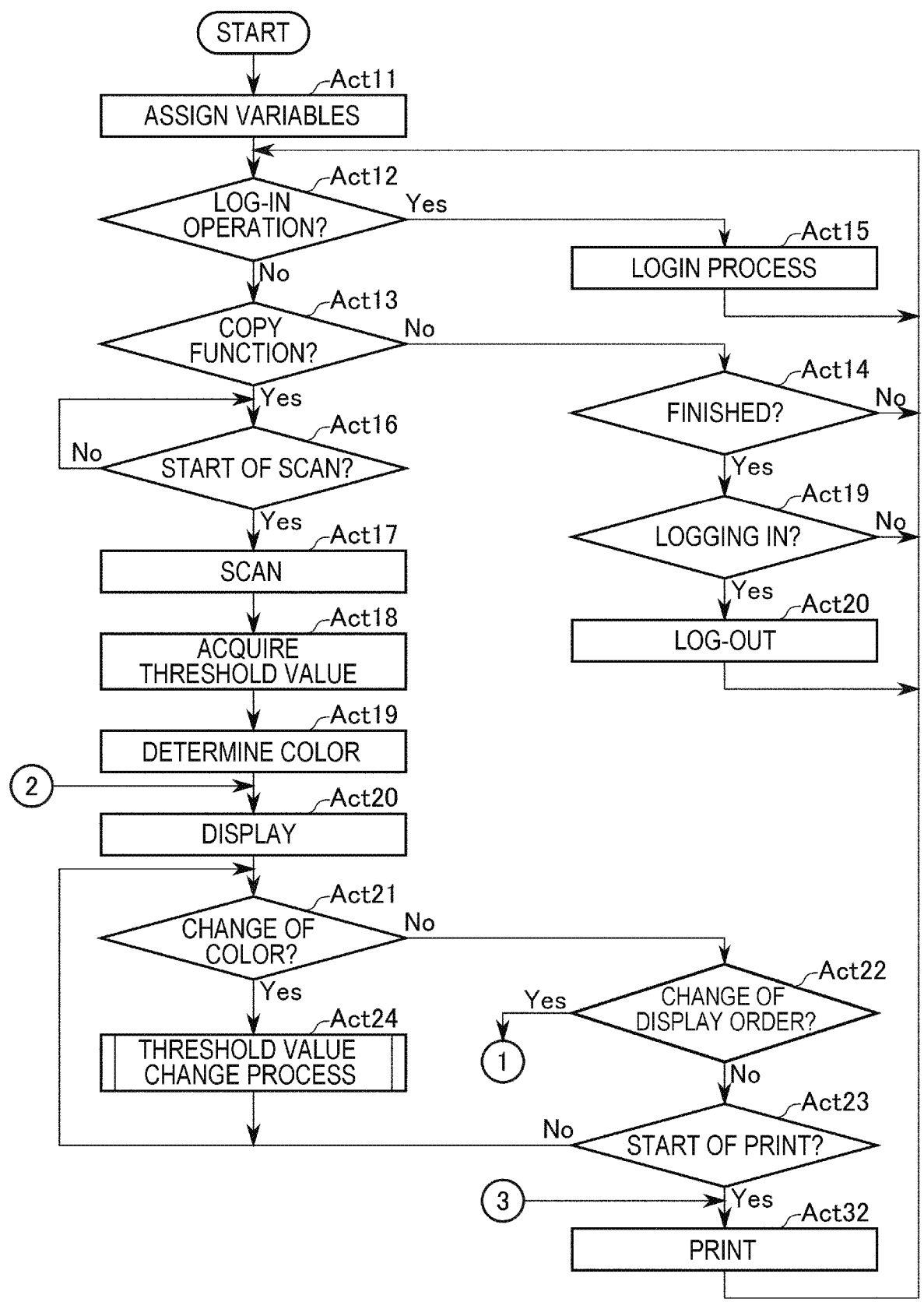
FIG. 3 is a flowchart of aspects of a process performed by a processor of an image forming apparatus.

Embodiment provide an image processing apparatus and an image processing method which reduce necessity of user intervention in setting an ACS function.

In general, according to one embodiment, an image processing apparatus includes a processor configured to acquire an image and to designate whether the image is a color image or a monochrome image. The designation is based on a comparison of a feature quantity of the image and a threshold value. A storage unit for storing the threshold value is provided. A display unit is provided for displaying whether the image has been designated a color image or a monochrome image by the processor. An input device, such as a touch panel or the like, is configured to receive user input for changing whether the image is designated a color image or a monochrome image. The processor is further configured to change the threshold value stored in the storage unit if the user input changes whether the image is designated a color image or a monochrome image. Hereinafter, the image forming apparatus according to an example embodiment will be described with reference to the drawings. In the drawings, the scale of aspects may vary from drawing to drawing and/or vary from an actual implementation for sake of explanatory convenience. In addition, the drawings certain aspects may be omitted so description and explanation may focus on other aspects.

FIG. 1 is a block diagram illustrating an example of the circuit configuration of main parts of an image forming apparatus 10 according to an embodiment. The image forming apparatus 10 is an example of an image processing apparatus.

The image forming apparatus 10 is, for example, a multifunction peripheral (MFP), a copier, or a facsimile machine, or the like. The image forming apparatus 10 includes, for example, a printing function, a scanning function, a copy function, a decoloring function, a facsimile function, and the like. The printing function refers to a forming an image on an image forming medium P, such as paper or the like, using a recording material, such as toner or ink. The image forming medium P is a sheet of paper in this embodiment and may thus also be referred to as paper P in this context. The scanning function refers to reading/acquiring an image from a document on which an image has been formed. The copy function refers to printing an image, read from a document using the scanning function, on paper P using the printing function. The decoloring function refers to decoloring an image formed on a paper P in a decolorable recording material. The image forming apparatus 10 includes, for example, a processor 11, a read-only memory (ROM) 12, a random access memory (RAM) 13, an auxiliary storage device 14, a communication interface 15, an operation panel 16, a scanner unit 17 and a printer unit 18.

The processor 11 can be a computer that performs calculations and control necessary for the operation of the image forming apparatus 10. The processor 11 controls the various units of the image forming apparatus 10 based on a program or programs, such as system software, application software, or firmware stored in the ROM 12, the auxiliary storage device 14, or the like. The processor 11 can comprise, for example, a central processing unit (CPU), a micro processing unit (MPU), a system on a chip (SoC), a digital signal processor (DSP), a graphics processing unit (GPU), an application specific integrated circuit (ASIC), a programmable logic device (PLD), or a field-programmable gate array (FPGA), or the like. Alternatively, the processor 11 is a combination of any of these elements.

The ROM 12 corresponds a system memory of a computer having the processor 11 as a core. The ROM 12 is a nonvolatile read only memory. The ROM 12 can store the program(s) executed by processor 11. In addition, the ROM 12 stores data or various setting values used by the processor 11 in performing various types of processes.

The RAM 13 corresponds to a system memory of a computer having the processor 11 as a core. The RAM 13 can be used as a workspace of the processor 11. The RAM 13 stores data temporarily used by the processor 11 in performing various types of processes.

The auxiliary storage device 14 is, for example, an electric erasable programmable read-only memory (EEPROM), a hard disk drive (HDD), a solid state drive (SDD), or the like. The auxiliary storage device 14 may store the program(s) executed by processor 11. In addition, the auxiliary storage device 14 may store data used by the processor 11 in performing various types of processes, data or various setting values generated by the processes of the processor 11, or the like. In addition, the auxiliary storage device 14 stores a history file including data relating to past printing jobs or the like. In addition, the image forming apparatus 10 may include an interface for receiving a storage medium, such as a memory card or a universal serial bus (USB) memory, to be used as the auxiliary storage device 14. The interface is utilized to read information stored in the storage medium attached thereto.

In addition, the auxiliary storage device 14 stores a table T1, illustrated in FIG. 2. FIG. 2 illustrates an example of a table that is stored in the auxiliary storage device 14.

The table T1 associates threshold values and history files with user identifiers (user IDs), for example. Each user ID, except for U00000, is an identifier uniquely assigned to registered users of the image forming apparatus 10. The user id U00000 indicates a non-log-in user or guest user. Here, a registered user refers to a user that has previously registered or been established as a user of the image forming apparatus 10. The image forming apparatus 10 can initially register a user, and then the registered user can log in whenever using the image forming apparatus 10. When a registered user logs in, the image forming apparatus may various load settings such as a threshold value previously stored for the user before the user uses the image forming apparatus 10. The threshold value and the history file will be described below.

As described above, the auxiliary storage device 14 is an example of a storage unit for storing a threshold value.

The program stored in the ROM 12 or the auxiliary storage device 14 includes a program for performing the below-described processes. For example, the image forming apparatus 10 may be transferred to an end user or the like in a state in which the program is stored in the ROM 12 or the auxiliary storage device 14. However, the image forming apparatus 10 may also be transferred to an end user or the like in a state in which the program is not stored in the ROM 12 or the auxiliary storage device 14, and the program may be separately transferred to the end user or the like. Likewise, the image forming apparatus 10 may be transferred to an end user or the like in a state in which a different program is stored in the ROM 12 or the auxiliary storage device 14 and the program for performing the below-described processes may be subsequently written in the ROM 12 or the auxiliary storage device 14 by operation of an administrator, a service technician, or the like. The transfer of the program can be realized, for example, by transfer via a removable storage medium such as a magnetic disk, a magneto-optical disk, an optical disk or a semiconductor memory, or by downloading via a network or the like.

The communication interface 15 refers to an interface for communication via a network or the like. The network is, for example, a communication network including a local area network (LAN), the Internet, or the like.

The operation panel 16 includes a main-machine interface for handling input and output operations between the image forming apparatus 10 and the user/operator of the image forming apparatus 10. The operation panel 16 includes, for example, a panel processor 161, an operation key 162 and a touch panel 163.

The panel processor 161 refers to, for example, a processor for performing overall control of the operation panel 16.

The operation key 162 refers to a button or the like for initiating and/or selecting operations of the image forming apparatus 10 by the operator.

The touch panel 163 is, for example, a stack of a display such as a liquid crystal display or an organic EL display, and a pointing device by touch input. The display including the touch panel 163 functions as a display for displaying a screen for informing the operator of a variety of information. In addition, the touch panel 163 functions as an input device for receiving touch input selections of the operator.

The scanner unit 17 reads an image from a document. The scanner unit 17 includes, for example, a scanner processor 171, a reading unit 172 and a document feeder 173.

The scanner processor 171 refers to a processor for performing overall control of the scanner unit 17.

The reading unit 172 is an optical reduction type scanner including an imaging element such as a charge-coupled device (CCD) image sensor. Alternatively, the reading unit 172 is a contact image sensor (CIS) type scanner including an imaging element such as a complementary metal-oxide semiconductor (CMOS) image sensor. Alternatively, the reading unit 172 may be any other well-known scanner type. The reading unit 172 reads an image from a document placed on a platen glass. Alternatively, the reading unit 172 reads an image from a document fed by the document feeder 173.

The document feeder 173 is, for example, referred to as an auto document feeder (ADF). The document feeder 173 successively feeds documents placed on a document tray in a stack or the like. The reading unit 172 reads the image of the fed document. The document tray includes a sensor for determining whether a document has been placed thereon. In addition, the document feeder 173 may include a scanner for reading an image from the back side of a document. Since the document feeder 173 includes a scanner and the scanner unit 17 can read images from both sides of the document without turning over (flipping) the document.

The printer unit 18 prints images/information on the paper P. The printer unit 18 includes, for example, a printer processor 181, an image forming unit 182 and a transfer control unit 183.

The printer processor 181 refers to a processor for performing overall control of the printer unit 18.

The image forming unit 182 prints an image on an paper P using a recording material such as ink or toner. The image forming unit 182 prints, for example, by using a dry electrophotographic type (laser printer) process, an inkjet type process or any other printing types. The image forming unit 182 prints, for example, using recording materials corresponding to colors of CMYK (cyan, magenta, yellow and key (black)). The image forming unit 182 can perform color printing and monochrome printing. In addition, the image forming unit 182 may perform printing by using a recording material capable of being decolored. The recording material capable of being decolored is a recording material that "decolors" at a temperature higher than some predetermined temperature to become substantial invisible by loss of obvious coloring in the recording material.

The transfer control unit 183 controls a motor for transferring the paper P or the like.

Figure 4:
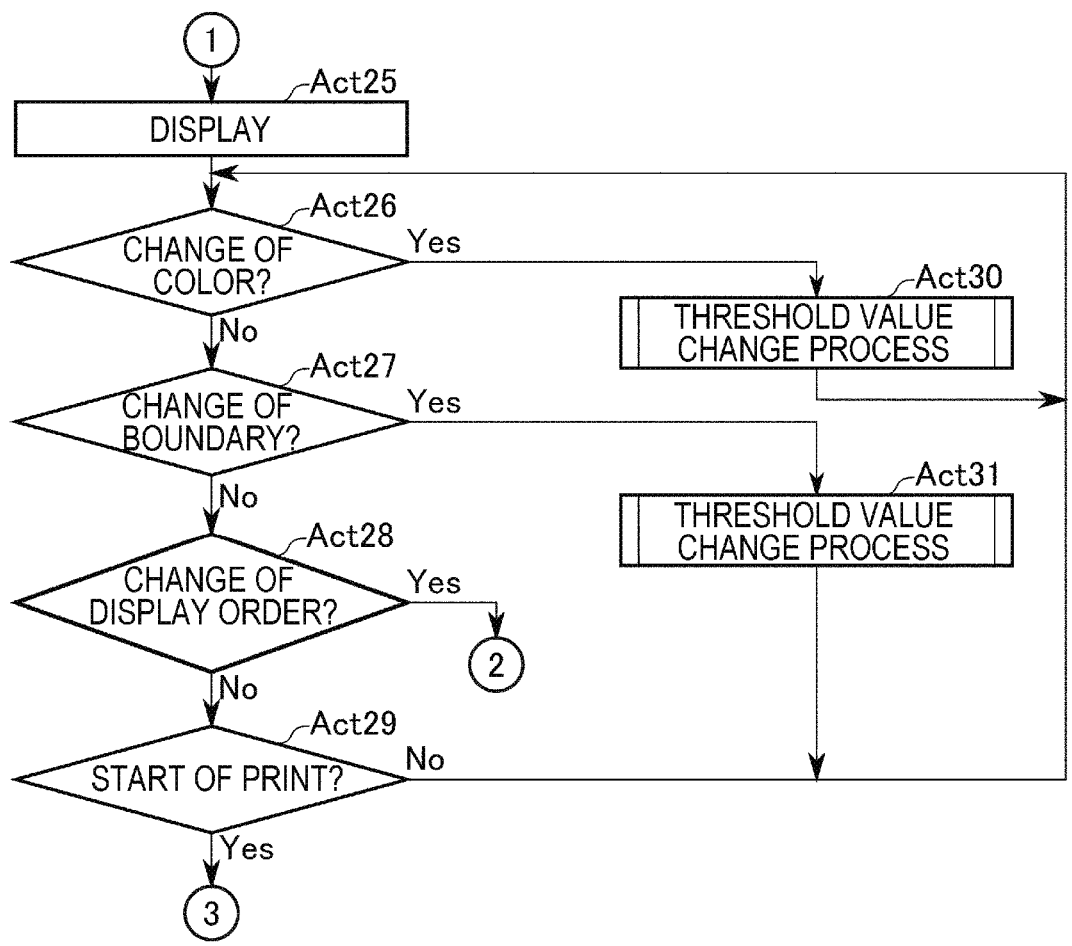
FIG. 4 is a flowchart of aspects of a process performed by a processor of an image forming apparatus.
Figure 5:
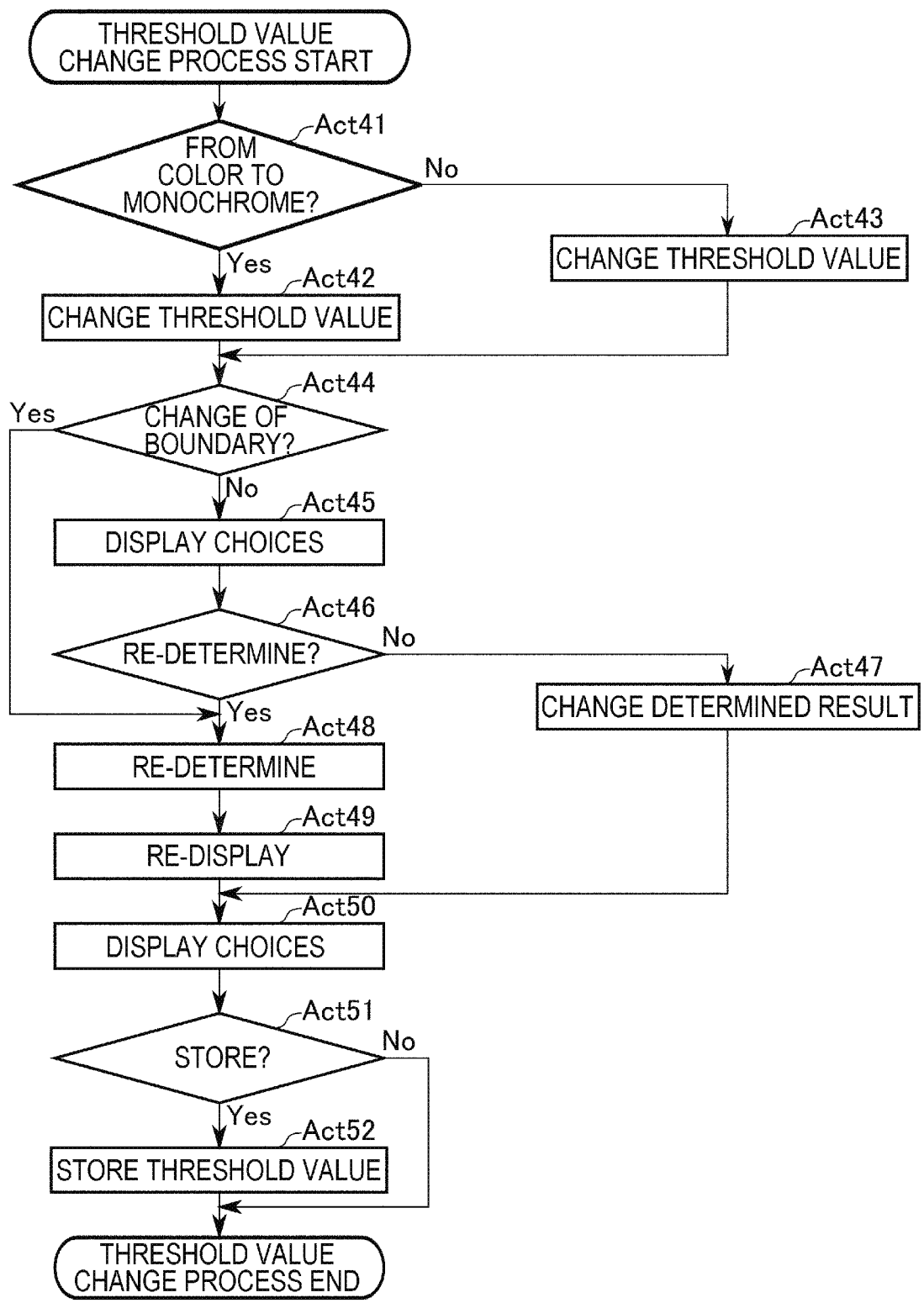
FIG. 5 is a flowchart of aspects of a process performed by a processor of an image forming apparatus.

Hereinafter, the operation of the image forming apparatus 10 according to an embodiment will be described with reference to FIGS. 3 to 5. The contents of the processes of the following description are given as examples and various processes capable of obtaining the same result can be appropriately used. FIGS. 3 to 5 are flowcharts of processes by the processor 11 of the image forming apparatus 10. The processor 11 performs these processes according to the programs stored in the ROM 12 or the auxiliary storage device 14.

The processor 11 starts the process of FIG. 3 at startup of the image forming apparatus 10, for example. The processor 11 sets a variable V1 and a variable V2 in the RAM 13 at the start of the process.

In Act 11, the processor 11 sets a value of the variable V1 to U00000, which is the user ID indicating the non-log-in user. The variable V1 indicates a user who is presently using the image forming apparatus. The value of the variable V1 of U00000 indicates that the operator of the image forming apparatus 10 is a non-log-in user.

In Act 12, the processor 11 determines whether or not log-in operation is performed. An operator who desires to log in to the image forming apparatus 10 performs a log-in operation such as, operator manipulates the operation panel 16 to input a user ID and a password. Alternatively, the operator operates a card reader provided in or with the image forming apparatus 10 to read an ID card for purposes of user log-in. The ID card stores information necessary for log-in, such as a user ID. Alternatively, the operator may perform log-in operation through biometric authentication. If a log-in operation is not performed, the processor 11 determines No in Act 12 and proceeds to Act 13.

In Act 13, the processor 11 determines whether or not the instruction to start the copy function is operated. If the instruction to start the copy function is not operated, the processor 11 determines No in Act 13 and proceeds to Act 14.

In Act 14, the processor 11 determines whether or not use of the image forming apparatus 10 is finished. For example, if the operation such as printing or any other has not been performed for a predetermined period of time or longer, the processor 11 determines that use of the image forming apparatus 10 has finished. Upon determining that use of the image forming apparatus 10 has not been finished, the processor 11 determines No in Act 14 and returns to Act 12. Thus, the processor 11 repeats Act 12 to Act 14 until either it is determined that log-in operation is performed, the instruction to start the copy function is received or use of the image forming apparatus 10 is deemed finished (e.g., by timing out by non-use).

When the log-in operation is performed in a standby state of Act 12 to Act 14, the processor 11 determines Yes in Act 12 and proceeds to Act 15.

In Act 15, the processor 11 performs a log-in process. That is, when an appropriate user ID and password are input and authentication related to the log-in attempt succeeds, the processor 11 sets the value of the variable V1 to the user ID of the user who has successfully logged in. In addition, when authentication related to log-in fails, the processor 11 displays a message indicating that log-in has failed on the touch panel 163. The processor 11 then returns to Act 12 after a failed login process in Act 15.

If the instruction to start the copy function is operated in the standby state of Act 12 to Act 14, the processor 11 determines Yes in Act 13 and proceeds to Act 16.

In Act 16, the processor 11 waits for to the instruction (user input or otherwise) to start a scan.

The operator of the image forming apparatus 10 places a document to be copied on the platen glass. Alternatively, the operator places documents to be copied on a tray provided with the document feeder 173. Then, the operator places the document on the platen glass or the documents on the tray and then inputs an instruction to start a scan by using the operation panel 16.

When the instruction to start scan is input, the processor 11 determines Yes in Act 16 and proceeds to Act 17.

In Act 17, the processor 11 controls the scanner unit 17, and successively scans the documents placed on the tray to read images as necessary. Alternatively, the processor 11 controls the scanner unit 17, and scans a document placed on the platen glass. By the scan process, the processor 11 acquires an image. Accordingly, the processor 11 operates as an acquisition unit for acquiring the image in cooperation with the scanner unit 17.

In addition, the color mode of the image acquired in Act 17 is typically RGB (red, green and blue).

In Act 18, the processor 11 acquires a threshold value associated with the present value of the variable V1 by referring to the table T1. The processor 11 sets the value of the variable V2 as an acquired threshold value corresponding to the user ID (value or variable V1). This threshold value is, for example, in a normalized range of 0 to 100.

For example, when the variable V1 is U00001, the processor 11 acquires a threshold value of 45 from the table T1 entry associated with user ID:U00001. If the value V1 is U00000, then processor 11 acquires the threshold value of 20 from the table T1 entry associated with user ID:U00000.

As described above, the RAM 13 can be used for storing the variable V2.

In Act 19, the processor 11 performs a color determination with respect to each image read from the document in Act 17. Here, "color determination" refers to a process for determination whether an acquired image is to be handled as a color image or a monochrome image. When it is determined an image is being handled as a color image, such an image is referred to as a "determined color image." When the image is being handled as a monochrome image, such an image is referred to as a "determination monochrome image." The image forming apparatus 10 performs color printing with respect to the determined color image. In addition, the image forming apparatus 10 performs monochrome printing with respect to the determined monochrome image. The processor 11 performs the following color determination with respect to each image, for example.

First, the processor 11 determines whether each of the pixels included in the image is a color pixel or not. For example, the processor 11 designates that any pixel having chroma at or above a certain level is a color pixel and any pixel having chroma below the certain level is designated a non-color pixel (i.e., not a color pixel). Alternatively, the processor 11 designates that a pixel is a non-color pixel if the three RGB component values (RGB levels) are equal to each other. For example, the processor 11 determines whether the three RGB component values are the same using a predetermined function. In addition, the processor 11 may determine whether a pixel is a color pixel using other methods.

The processor 11 counts the total number of pixels which are designated as color pixels. When the ratio of the total number designated color pixels in the image to the total number of all pixels in the image is greater than or equal to the value of the variable V2, the image will be handled as a color image (that is, the image is a designated color image). In contrast, this ratio is less than the value of the variable V2, the image will be handled as a monochrome image (that is, the image is a designated monochrome image). The value of this ratio of the designated color pixels in the image to total pixels, in the image is referred to as a "color feature quantity" of the image. The color feature quantity is reported in a scale range of 0 (no color pixels in the image) to 100 (only color pixels in the image) in this embodiment. The color feature quantity is one example of a "feature quantity."

As described above, the processor 11 operates as an example of a determination unit for analysis of whether an image is a color image or a monochrome image based on a comparison of the color feature quantity to the threshold value (variable V2 value).

In addition, the processor 11 stores the color feature quantity derived in Act 19 in the RAM 13 or the auxiliary storage device 14 in association with the respective image. In addition, the processor 11 calls upon or loads a history file associated with the user ID presently assigned to the variable V1 by referring to the table T1. The processor 11 adds the color feature quantity derived in Act 19 to the appropriate history file. Therefore, each history file stores a list of color feature quantities derived in the past for each user ID.

Figure 6:
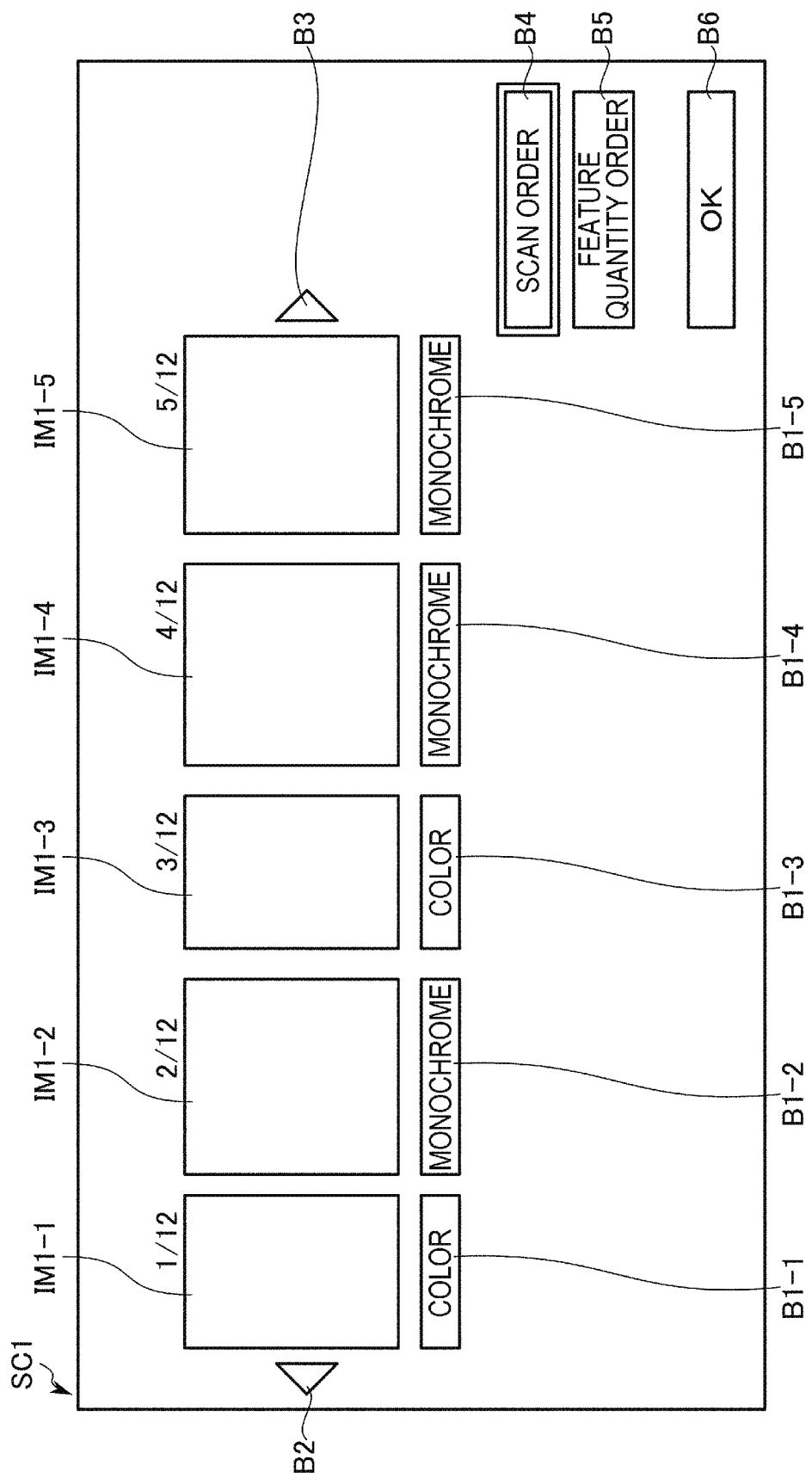
FIG. 6 depicts an example of a screen displayed on a touch panel.

In Act 20, the processor 11 generates an image corresponding to screen SC1 illustrated in FIG. 6. The processor 11 also instructs the operation panel 16 to display this generated image. Upon receiving this instruction, the touch panel 163 displays the screen SC1.

FIG. 6 is a diagram illustrating an example of a screen SC1 displayed on the touch panel 163.

The screen SC1 is a screen for displaying a color determination result of each image read in Act 17. The screen SC1 is also a screen permitting a changing of the color determination result of each image. The depicted screen SC1 includes an image IM1 and buttons B1 to B6.

The screen SC1 includes at least one image IM1. The image IM1 is an image read in Act 17. If there are a plurality of images read in Act 17, then a plurality of images IM1 are displayed on the screen SC1 side by side. FIG. 6 illustrates a case in which five images IM1 (IM1-1 to IM1-5) are displayed side by side. On the screen SC1, the order of images IM1 is the order of images as read by the scanner unit 17 in Act 17. Accordingly, the order that the images IM1 are displayed may be the order of printing images. The image IM1 displayed on the leftmost side may be the first read image or the image IM1 displayed on the rightmost side may be the first read image. In addition, whether the image IM1 displayed on the left side is read first or the image IM1 displayed on the right side is read first may be switched. Such switching is, for example, based on a selection by the operator.

In addition, on each image IM1 a number (indexing number) indicating the reading order of each image IM1 in Act 17, with the numeral 1 representing the first read image (IM1-1), the numeral 2 representing the second read image (IM1-2), and so forth. But in other examples, the indexing numbers indicating the reading order of each image in Act 17 can be reversed such that numeral 1 corresponds to the last read image rather than the first read image.

The screen SC1 includes at least one button B1. Each of the buttons B1 correspond to an images IM1 on one-to-one. Accordingly, the screen SC1 includes the same number of buttons B1 and images IM1. FIG. 6 illustrates a state in which five buttons B1-1 to B1-5 are displayed to correspond to the images IM1-1 to IM1-5 side by side. The button B1 shows the character string indicating the color determination result of the image IM1. When the image IM1 corresponding to the button B1 is a determined color image, "color" is displayed on the button B1. When the image IM1 corresponding to the button B1 is a determined monochrome image, for example, "monochrome" is displayed on the button B1. The button B1 is a button operated by the operator to instruct the change of the color determination result of the corresponding image IM1. That is, the button B1 is a button operated by the operator to instruct the change of the image IM1 to a determined monochrome image if the corresponding image IM1 is a determined color image. In this case, the button B1 is a button for receiving "first input" for instructing an image IM1 determined as a color image (a determined color image) to be handled as a monochrome image. Likewise, the button B1 operates to instruct the changing of an image IM1 determined as a monochrome image (a determined monochrome image) to an image to be handled as a color image, that is a determined color image, if the corresponding image IM1 was initially a determined monochrome image. In this case, the button B1 is a button for receiving "second input" for instructing the image determined as a monochrome image to be handled as a color image.

The button B2 and the button B3 are operable, for example, when all the images read in Act 17 cannot be displayed on the screen SC1 at the same time. The button B2 and the button B3 are buttons operated by the operator to forwardly or backwardly move the display of the image IM1. Therefore, even when all the images read in Act 17 cannot be displayed on the screen SC1 at once, the operator can still confirm or change the color determination results of all the images read in Act 17 by operating the button B2 or the button B3 as needed.

The button B4 and the button B5 are buttons to change the display order of the images IM1.

The button B4 can be selected to set the displayed order of the images IM1 to the order of the images as read in Act 17. However, in this instance, the displayed order of the images IM1 on the screen SC1 is already the order of the images as read in Act 17. Accordingly, the button B4 on the screen SC1 may be set to be not operable/selectable. In addition, the button B4 may be highlighted, as illustrated in FIG. 6, to indicate that the current displayed order is already the order of the images as read in Act 17.

The button B5 is a button selected by the operator to change the displayed order of the images IM1 to be ordered by color feature quantities derived in the color determination of Act 19.

The button B6 is a button to instruct to end the display of the screen SC1 and to start printing of the images read in Act 17.

As described above, the touch panel 163 is an example of a display unit for displaying the determination result by the determination unit. In addition, the touch panel 163 is an example of an input unit for receiving change input of the determination result.

In Act 21, the processor 11 determines whether the instruction to change the color determination result has been input. That is, the processor 11 determines whether predetermined operation of operating the button B1 has been performed. If the instruction to change the color determination result has not been input, the processor 11 determines No in Act 21 and proceeds to Act 22.

In Act 22, the processor 11 determines whether the instruction to change the display order has been input. That is, the processor 11 determines whether the predetermined operation of operating the button B5 has been performed. If the instruction to change the display order has not been input, the processor 11 determines No in Act 22 and proceeds to Act 23.

In Act 23, the processor 11 determines whether the instruction to start printing has been input. That is, the processor 11 determines whether the predetermined operation of operating the button to instruct to start printing has been performed. If the instruction to start printing has not been input, the processor 11 determines No in Act 23 and returns to Act 21. Thus, the processor 11 repeats Act 21 to Act 23 until the instruction to change the color determination result, the instruction to change the display order or the instruction to start printing is input.

If the instruction to change the color determination result has been input in the standby state of Act 21 to Act 23, the processor 11 determines Yes in Act 21 and proceeds to Act 24.

In Act 24, the processor 11 performs a threshold value changing process illustrated in FIG. 5 with respect to the image corresponding to the selected button B1.

In Act 41 of FIG. 5, the processor 11 determines whether the operation of instructing the change of the color determination result is the operation of instructing the change from the determined color image to the determined monochrome image. If the operation is the operation of instructing the change from the determined color image to the determined monochrome image, the processor 11 determines Yes in Act 41 and proceeds to Act 42.

Figure 7:
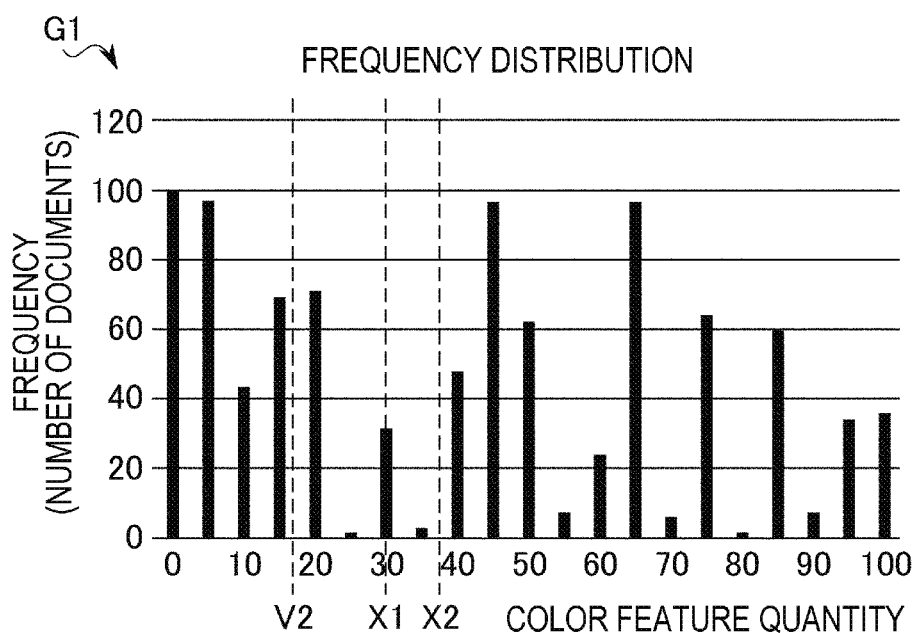
FIG. 7 illustrates aspects of a method of deriving a threshold value.

In Act 42, the processor 11 derives a new threshold value. In addition, the processor 11 changes the value of the variable V2 to the derived new threshold value. As examples of a method of deriving a new threshold value, the following four methods (1) to (4) will be described. A method of deriving a new threshold value will be described with reference to FIG. 7. The graph G1 illustrated in FIG. 7 indicates the frequency distribution of the color feature quantity derived in the past. The processor 11 generates the frequency distribution using a history file associated with the user ID assigned to the variable V1. The feature quantity X1 illustrated in FIG. 7 is the color feature quantity of a target image. A threshold value X2 is a derived new threshold value. In addition, the bin increment of the graph G1 illustrated in FIG. 7 is set to 5.

(1)

The processor 11 sets a threshold value X2 by adding a predetermined value C1 to the feature quantity X1. That is, X2=X1+C1. Here, the value C1 is a value greater than 0. The value C1 is determined by the designer of the image forming apparatus 10, for example.

(2)

The processor 11 sets threshold value X2 to a value obtained by multiplying the feature quantity X1 by a predetermined value C1. That is, X2=X1×C2. Here, the value C2 is a value greater than 1. The value C2 is determined by the designer of the image forming apparatus 10, for example.

(3)

The processor 11 sets a threshold value X2 by adding a value obtained by multiplying (feature quantity X1−variable V2) by a predetermined value C3 to the variable V2. That is, X2=V2+(X1−V2)×C3. Here, the value C3 is a value greater than 1. The value C3 is determined by the designer of the image forming apparatus 10, for example.

(4)

The processor 11 obtains the class value CV1 of the feature quantity X1. For example, in FIG. 7, the class value CV1 is 30. The processor 11 obtains a class value CV2 that is next to the class value C1 on the increasing color feature quantity side. In FIG. 7, the class value CV2 is 35. The processor 11 determines whether the frequency of the class value CV2 is small or not. For example, the processor 11 determines that the frequency is small if the frequency of the class value CV2 is smaller than the average value of the frequencies. Alternatively, the processor 11 determines that the frequency is small if the frequency of the class value CV2 is smaller than a value obtained by multiplying the average value of the frequencies by some predetermined ratio. Alternatively, the processor 11 determines that the frequency of the class value CV2 is small if the frequency of the class value CV2 is smaller than the frequency of the class value CV1. Alternatively, the processor 11 determines that the frequency of the class value CV2 is small if the frequency of the class value CV2 is smaller than a value obtained by multiplying the frequency of the class value CV1 by a predetermined ratio. Upon determining that the frequency of the class value CV2 is small, the processor 11 sets the value of the threshold value X2 to be equal to or greater than the class value CV2. For example, the processor 11 obtains the threshold value X2 by X2=CV2+C4 or X2=CV2×C5. Here, the value C4 is equal to or greater than 0. In addition, the value C5 is equal to or greater than 1. The value C4 and the value C5 are, for example, values predetermined by the designer of the image forming apparatus 10, or the like. Upon determining that the frequency of the class value CV2 is not small, the processor 11 obtains the threshold value X2, for example, using any one of the methods (1) to (3). However, the processor 11 preferably sets the value of the threshold value X2 to be less than the class value CV2 when it is determined that the frequency of the class value CV2 is not small.

In addition, when the threshold value X2 is obtained using the methods (1) to (3) and the threshold value X2 exceeds an upper limit value (X3), the processor 11 may set the value of the threshold value X2 to the upper limit value X3, which may be obtained by an equation such as X3=V2+C6 or X3=V2×C7, where the value C6 is a value greater than 0 and the value C7 is a value greater than 1. The value C6 and the value C7 are, for example, values predetermined by the designer of the image forming apparatus 10, or the like. If the method (4) is used, then similarly to the case of determining that the frequency of the class value CV2 is small, the processor 11 may set the value of the threshold value X2 to the upper limit value X3 if the threshold value X2 exceeds the upper limit value X3.

In addition, the processor 11 may determine that the frequency of the class CV2 is small if the threshold X2 is obtained using the method (4), and may set the value of the threshold value X2 to an upper limit value (X4) if the threshold value X2 exceeds the upper limit value (X4), where X4=CV2+C8 or X4=CV2×C9, where the value C8 is a value equal to or greater than 0 and the value C9 is a value equal to or greater than 1. The value C8 and the value C9 are, for example, values predetermined by the designer of the image forming apparatus 10, or the like. However, the upper limit value X4 is preferably equal to or greater than the feature quantity X1.

By setting the upper limit values in this way, it is possible to prevent the color determination result from being significantly changed.

As described above, by the process of Act 42, the threshold value assigned to the variable V2 is changed to a larger value.

If the operation to instruct the change of the color determination result is the operation to instruct the change from the determined monochrome image to the determined color image, the processor 11 determines No in Act 41 and proceeds to Act 43.

Figure 8:
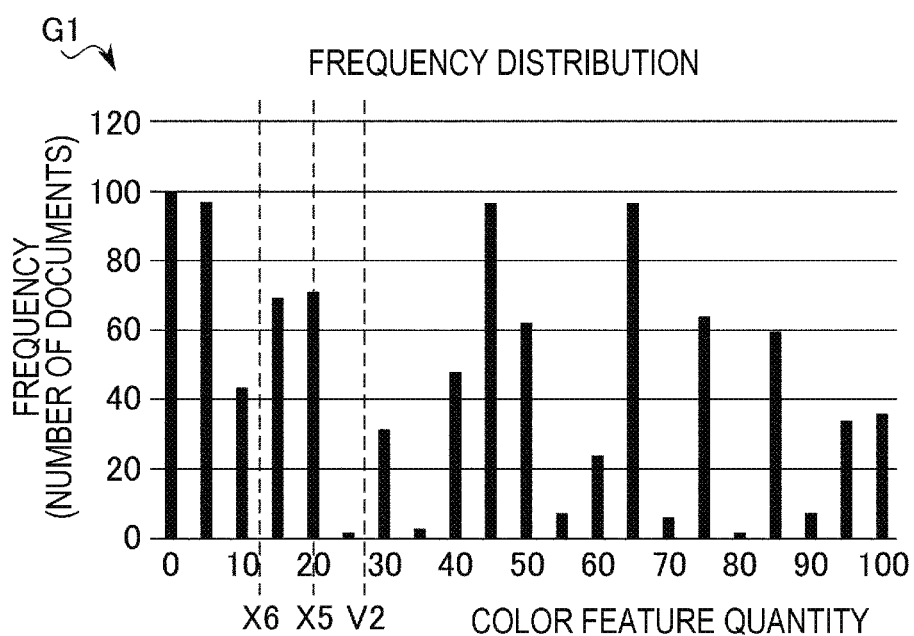
FIG. 8 illustrates aspects of a method of deriving a threshold value.

In Act 43, the processor 11 derives a new threshold value. In addition, the processor 11 changes the value of the variable V2 to the derived new threshold value. As examples of a method of deriving a new threshold value, the following four methods (5) to (8) will be described. The method of deriving a new threshold value will be described with reference to FIG. 8. FIG. 8 is a diagram illustrating a method of deriving a threshold value. The graph G1 illustrated in FIG. 8 indicates the frequency distribution of the color feature quantity derived up to now. The processor 11 generates the frequency distribution using a history file associated with the user ID assigned to the variable V1. The feature quantity X5 illustrated in FIG. 8 is the color feature quantity of a target image, and a threshold value X6 is a derived new threshold value.

(5)

The processor 11 sets a threshold value X6 to the feature quantity X5 minus a predetermined value C11. That is, $X6=X5-C11$, where the value C11 is a value greater than 0. The value C11 is determined, for example, by the designer of the image forming apparatus 10, or the like.

(6)

The processor 11 sets the threshold value X6 to a value obtained by multiplying the feature quantity X5 by a predetermined value C12. That is, $X6=X5 \times C12$, where the value C12 is a value less than 1. The value C12 is determined by the designer of the image forming apparatus 10, for example.

(7)

The processor 11 sets the threshold value X6 to variable V2 plus a value obtained by multiplying (feature quantity X5−variable V2) by a predetermined value C13. That is, $X6=V2+(X5-V2) \times C13$, where the value C13 is a value greater than 1. The value C13 is determined, for example, by the designer of the image forming apparatus 10, or the like.

(8)

The processor 11 obtains the class value CV3 of the feature quantity X5. For example, in FIG. 8, the class value CV3 is 20. The processor 11 obtains a class value (CV4) that is next to the class value C3 on the lower color feature quantity side. In FIG. 8, the class value CV4 is 15. The processor 11 determines whether or not the frequency of the class value CV4 is small. For example, the processor 11 determines that the frequency is small when the frequency of the class value CV4 is smaller than the average value of the frequencies. Alternatively, the processor 11 determines that the frequency is small when the frequency of the class value CV4 is smaller than a value obtained by multiplying the average value of the frequencies by a predetermined ratio. Alternatively, the processor 11 determines that the frequency of the class value CV4 is small when the frequency of the class value CV4 is smaller than the frequency of the class value CV3. Alternatively, the processor 11 determines that the frequency of the class value CV4 is small when the frequency of the class value CV4 is smaller than a value obtained by multiplying the frequency of the class value CV3 by some predetermined ratio. Upon determining that the frequency of the class value CV4 is small, the processor 11 sets the value of the threshold value X6 to be equal to or less than the class value CV4. For example, the processor 11 sets the threshold value X6 according to $X6=CV4-C14$ or $X6=CV4 \times C15$, where the value C14 is a value equal to or greater than 0, and the value C15 is a value equal to or greater than 0 and equal to or less than 1. The value C14 and the value C15 are, for example, values predetermined by the designer of the image forming apparatus 10, or the like. Upon determining that the frequency of the class value CV4 is not small, the processor 11 obtains the threshold value X6, for example, using any one of the methods (5) to (7).

However, the processor 11 preferably sets the value of the threshold value X6 to be greater than the class value CV4 when it is determined that the frequency of the class value CV4 is not small.

When the threshold value X6 is obtained using the methods (5) to (7) and the threshold value X6 is less than some lower limit value (X7), the processor 11 may set the value of the threshold value X6 to the lower limit value (X7). The processor 11 may set the lower limit value X7 by an equation such as $X7=V2-C16$ or $X7=V2 \times C17$, where the value C16 is a value greater than 0, and the value C17 is a value less than 1. The value C16 and the value C17 are, for example, values predetermined by the designer of the image forming apparatus 10. If the method (8) is used, similarly to the case of determining that the frequency of the class value CV4 is small, the processor 11 may set the value of the threshold value X6 to the lower limit value X7 when the threshold X6 is less than the lower limit value X7.

In addition, the processor 11 may determine that the frequency of the class CV4 is small if the threshold X6 is obtained using the method (8), and may set the value of the threshold value X6 to a lower limit value (X8) if the threshold value X6 is less than the lower limit value (X8). For example, the processor 11 obtains the lower limit value X8 by an equation such as $X8=CV4-C18$ or $X8=CV4 \times C19$, where the value C18 is a value equal to or greater than 0, and the value C19 is a value equal to or less than 1. The value C18 and the value C19 are, for example, values predetermined by the designer of the image forming apparatus 10. However, the lower limit value X8 is preferably equal to or less than the feature quantity X4.

By setting the lower limit values in this way, it is possible to prevent the color determination result from being significantly changed.

As described above, by the process of Act 43, the threshold value assigned to the variable V2 is changed to a smaller value.

As described above, the processor 11 performs the process of Act 42 or Act 43 and thus operates as an example of a changing unit for changing the threshold value.

The processor 11 proceeds to Act 44 after Act 42 or Act 43.

In Act 44, the processor 11 determines whether the threshold value changing process is performed by boundary change. Although boundary change is described below, the processor 11 determines that the threshold value changing process is performed by boundary change when the threshold value changing process is the threshold value changing process in the process of Act 31. If it is determined that the threshold value changing process is performed by boundary change, the processor 11 determines no in Act 44 and proceeds to Act 45.

In Act 45, the processor 11 displays, on the touch panel 163, an image for asking the operator about whether to perform color determination with respect to each image read in Act 17 based on the new threshold value derived in Act 42 or Act 43. The image is, for example, popped up over the contents already displayed on the touch panel 163. The image includes a button to be selected by the operator to instruct performance of the color determination and a button to be selected by the operator to instruct non-performance of the color determination. The processor 11 closes the pop-out according to selection of any button and returns to the original screen.

In Act 46, the processor 11 determines whether to perform the color determination based on the new threshold value derived in Act 42 or Act 43. For example, the processor 11 determines that color determination is not to be performed when the button selected by the operator instructs non-performance. If it is determined that color determination is not to be performed, the processor 11 determines No in Act 46 and proceeds to Act 47.

In Act 47, the processor 11 changes the determination result of the target image. That is, the processor 11 changes the determination result to a monochrome determination (determined monochrome image) if the target image is a determined color image. Likewise, the processor 11 changes the determination result to a determined color image if the target image is a determined monochrome image. In addition, the processor 11 changes "color" to "monochrome" or "monochrome" to "color" with respect to the character string included in the button B1 corresponding to the target image.

The processor 11 determines to perform color determination when the button to instruct performance of the color determination is selected. The processor 11 determines Yes in Act 46 upon determining that color determination is performed, and proceeds to Act 48. In addition, if it is determined that the threshold value changing process is performed by boundary change, the processor 11 determines Yes in Act 44 and proceeds to Act 48.

In Act 48, the processor 11 performs the color determination with respect to each image based on the new threshold value provided in Act 42 or Act 43. The processor 11 performs color determination using the color feature quantity, since the color feature quantity of each image has already been derived, unlike with the case of the color determination performed in Act 19.

In Act 49, the processor 11 updates the character string displayed on each button B1 based on the determination result of Act 48.

The processor 11 proceeds to Act 50 after the process of Act 47 or Act 49.

In Act 50, the processor 11 displays, on the touch panel 163, an image for asking the operator about whether to store the new threshold value derived in Act 42 or Act 43. The image is, for example, popped up over the contents already displayed on the touch panel 163. The image includes a button selectable by the operator to store the new threshold value derived in Act 42 or Act 43 and a button selectable by the operator not to store the new threshold value. The processor 11 closes the pop-out according to operation of any button and returns to the original screen.

In Act 51, the processor 11 determines whether to store the new threshold value derived in Act 42 or Act 43. The processor 11 determines to store the threshold value, for example, if the button to store the threshold value is selected. If it is determined to store the threshold value, the processor 11 determines Yes in Act 51 and proceeds to Act 52.

In Act 52, the processor 11 updates the table T1 and stores the new threshold value derived in Act 42 or Act 43. That is, the processor 11 sets the threshold value associated with the user ID corresponding to the present value of the variable V1 to value of the variable V2 in the table T1. The processor 11 finishes the threshold value changing process illustrated in FIG. 5 after the process of Act 52.

In contrast, the processor 11 determines not to store the threshold value, if the button instructing not to store the new threshold value is selected. If it is determined not to store the new threshold value, the processor 11 determines No in Act 51 and finishes the threshold value changing process illustrated in FIG. 5.

The processor 11 returns to Act 21 after the process of Act 24 of FIG. 3.

When the instruction to change the display order is operated in the standby state of Act 21 to Act 23, the processor 11 determines Yes in Act 22 and proceeds to Act 25 of FIG. 4.

In Act 25, the processor 11 generates an image corresponding to the screen SC2 illustrated in FIG. 9. In addition, the processor 11 instructs the operation panel 16 to display the generated image. The operation panel 16, which has received this instruction, displays the screen SC2.

FIG. 9 is a diagram illustrating an example of the screen SC2 displayed on the touch panel 163.

The screen SC2 includes, for example, a button B7 in addition to the images IM1 and the buttons B1 to B6.

For the images IM1 and the buttons B1 to B6, only the portions different from those of screen SC1 will be described.

The screen SC2 is different from the screen SC1 in the display order of the images IM1. On the screen SC2, the order of the images IM1 is the order of the color feature quantities stored in Act 19 of FIG. 3. In some variations, the image IM1 displayed on the left side may have a larger color feature quantity or the image IM1 displayed on the right side may have a larger color feature quantity. Whether the image IM1 displayed on the left side has a larger color feature quantity or the image IM1 displayed on the right side has a larger color feature quantity may be switched. Such switching is, for example, based on an input by or preference of the operator. In FIG. 9, the image IM1 displayed on the right side has a larger color feature quantity.

A button B5 is a button operated by the operator to set the display order of the images IM1 to the order of the color feature quantities derived in the color determination of Act 19. However, the display order of the images IM1 on the screen SC2 is already corresponding to the order of the color feature quantities. Accordingly, the button B5 of the screen SC2 may be set not to be operable (e.g., grayed out). In addition, the button B5 of the screen SC2 may be highlighted as illustrated in FIG. 9 in order to indicate that the current display order is the order of the color feature quantities.

The screen SC2 includes a button B7 for each of the images IM1 displayed, except one. Here, FIG. 9 illustrates four buttons B7 (buttonB7-1, button B7-2, button B7-3, and buttonB7-4) and five images IM1 (image IM1 1-1, image IM1 1-2, image IM1 1-3, image IM1 1-4, and image IM1 1-5). Each button B7 is, for example, displayed at a position between an adjacent pair of images IM1, as illustrated in FIG. 9. There is one button B7 (button B7-2) denoted by a solid line and three buttons B7 (B7-1, B7-3, and b7-4) denoted by a dotted line, as illustrated in FIG. 9. The button B7 denoted by the solid line indicates a boundary line (changeover) between a determined monochrome image and a determined color image. That is, images IM1 displayed on the left side of the button B7 denoted by the solid line indicates determined monochrome images and the right side thereof indicates determined color images. In FIG. 9, the image IM1-2 displayed on the left side of the button B7-2 denoted by the solid line is a determined monochrome image and the image IM1-3 displayed on the right side is a determined color image. In addition, if all the images displayed on the screen SC2 are determined monochrome images or determined color images, then all buttons B7 are denoted by the dotted line. Any button B7 denoted by the dotted line is a button that will change the boundary between the determined monochrome image and the determined color image to the position of the selected button B7. Accordingly, the button B7 denoted by the dotted line is an example of a button for receiving third input to instruct the change of the boundary between the monochrome image and the color image. In addition, among the buttons B7 denoted by the dotted line, if both the image IM1 displayed on the right side and the image IM1 displayed on the left side are determined monochrome images, the button B7 is a button operated by the operator to instruct to change the image IM1 displayed on the right side of the button B7 to the determined color image. Accordingly, in this case, the button B7 is a button for receiving second input to instruct to handle the image determined as the monochrome image as a color image. In addition, among the buttons B7 denoted by the dotted line, if both the image IM1 displayed on the right side and the image IM1 displayed on the left side are determined color images, the button B7 is a button operated by the operator to instruct to change the image IM1 displayed on the left side of the button B7 to the determined monochrome image. Accordingly, in this case, the button B7 is a button for receiving first input to instruct to handle the image determined as the color image as a monochrome image. In addition, unlike the case illustrated in FIG. 9, if the image IM1 displayed on the left side has a larger color feature quantity, then left and right sides are reversed accordingly in the above description.

In addition, the processor 11 can make the screen SC2 include images IM1, which are the determined monochrome images, and images IM1, which are the determined color images when displaying the screen SC2 in Act 25. In other words, the processor 11 makes the screen SC2 include a button B7 denoted by the solid line when displaying the screen SC2 in Act 25. However, the above does not apply to the case where all the images read in Act 17 are determined color images or the case where all the images are determined monochrome images. By confirming the boundary between the determined monochrome images and the determined color images when the screen SC2 is displayed, the operator can easily confirm the boundary between the determined monochrome images and the determined color images and can more easily perform operations.

In Act 26, the processor 11 determines whether the instruction to change the color determination result has been received. That is, the processor 11 determines whether the button B1 has been selected. When the instruction to change the color determination result has not been input, the processor 11 determines No in Act 26 and proceeds to Act 27.

In Act 27, the processor 11 determines whether a change of the boundary between the determined monochrome image and the determined color image has been received. That is, the processor 11 determines whether a button B7 has been selected. When the change of the boundary between the determined monochrome image and the determined color image has not been received, the processor 11 determines No in Act 27 and proceeds to Act 28.

In Act 28, the processor 11 determines whether the instruction to change the display order has been input. That is, the processor 11 determines whether the button B4 has been selected. If the instruction to change the display order has not been input, the processor 11 determines No in Act 28 and proceeds to Act 29.

In Act 29, the processor 11 determines whether the instruction to start printing has been input. That is, the processor 11 determines whether the button B6 has been selected. If the instruction to start printing has not been received, the processor 11 determines No in Act 29 and returns to Act 26. Thus, the processor 11 repeats Act 26 to Act 29 until an instruction to change the color determination result, a change of the boundary between the determined monochrome image and the determined color image, an instruction to change the display order, or an instruction to start printing is received.

If the instruction to change the color determination result is input in the standby state of Act 26 to Act 29, the processor 11 determines Yes in Act 26 and proceeds to Act 30.

In Act 30, the processor 11 performs the threshold value changing process illustrated in FIG. 5 with respect to the image corresponding to a selected button B1. The processor 11 returns to Act 26 after the process of Act 30.

If the change of the boundary between the monochrome image and the determined color image is received in the standby state of Act 26 to Act 29, the processor 11 determines Yes in Act 27 and proceeds to Act 31.

In Act 31, the processor 11 performs the threshold value changing process illustrated in FIG. 5 with respect to the image having a larger color feature quantity when both images displayed on the left and right sides of the selected button B7 are determined monochrome images. In contrast, the processor 11 performs the threshold value changing process illustrated in FIG. 5 with respect to the image having a smaller color feature quantity when both images displayed on the left and right sides of the selected button B7 are determined color images. The processor 11 returns to Act 26 after the process of Act 31.

If the instruction to change the display order is input in the standby state of Act 26 to Act 29, the processor 11 determines Yes in Act 28 and proceeds to Act 20 of FIG. 3.

If the instruction to start printing is received in the standby state of Act 26 to Act 29, the processor 11 determines Yes in Act 23 and proceeds to Act 32. If the instruction to start printing is input in the standby state of Act 26 to Act 29 of FIG. 4, the processor 11 determines Yes in Act 29 and proceeds to Act 32 of FIG. 3.

In Act 32, the processor 11 prints the image read in Act 17. At this time, the processor 11 controls to print the determined color image in color. In addition, the processor 11 controls to print the determined monochrome image in monochrome. In addition, the image printed in color is printed, for example, in CMYK color. In addition, the image printed in monochrome is printed, for example, in black and white. The processor 11 returns to Act 12 after the process of Act 32.

If it is determined in the standby state of Act 12 to Act 14 that use of the image forming apparatus 10 has been finished, the processor 11 determines Yes in Act 14 and proceeds to Act 33.

In Act 33, the processor 11 determines whether the image forming apparatus 10 is in a logged-in state. The processor 11 determines that the image forming apparatus 10 is in the logged-in state, for example, when the value of the variable V1 is not U00000. That is, the processor 11 determines that the image forming apparatus 10 is in the logged-in state when the value of the variable V1 is the user ID of a registered user. If it is determined that the image forming apparatus 10 is not in the logged-in state, the processor 11 determines No in Act 33 and returns to Act 12. In contrast, if it is determined that the image forming apparatus 10 is in the logged-in state, the processor 11 determines Yes in Act 33 and proceeds to Act 36.

In Act 36, the processor 11 releases the logged-in state. For example, the processor 11 sets the value of the variable V1 to U00000. The processor 11 returns to Act 12 after the process of Act 36.

The image forming apparatus 10 of an embodiment determines whether each image read by the scanner unit 17 is to be handled as a color image or a monochrome image.

The image forming apparatus 10 uses a threshold value for this determination. When the operator inputs the instruction to change the determination result, the image forming apparatus 10 changes the threshold value. The image forming apparatus 10 can change the determination results of multiple images at once by performing the determination with respect to each image using the changed threshold value. Accordingly, the operator's efforts are reduced. In addition, the image forming apparatus 10 performs the determination with respect to each image subsequently read by the scanner unit 17 using the changed threshold value, thereby increasing the possibility of obtaining a determination result that is as desired by the operator as compared to the determination using an unchanged threshold value.

In addition, the image forming apparatus 10 of an embodiment increases the threshold value when the instruction to change a determined color image to a determined monochrome image has been input. The image forming apparatus 10 of an embodiment decreases the threshold value when the instruction to change a determined monochrome image to a determined color image has been input. Thus, the image forming apparatus 10 can increase a possibility of obtaining a determination result likely to be desired by the operator by determining whether to handle each image read by the scanner unit 17 as a color image or a monochrome image, using the changed threshold value.

In addition, the image forming apparatus 10 displays each image read by the scanner unit 17 on the touch panel 163 in the order of color feature quantities indicating the degree of color image. In addition, the threshold value changing process is performed according to the operation to indicate the boundary between the determined color image and the determined monochrome image. By displaying the images in the order of color feature quantities indicating the degree of the color image, the operator can easily confirm which image has a changed determination result, with changed threshold value. In addition, since the operation to indicate the boundary between the determined color image and the determined monochrome image is possible, the operator can intuitively perform such an operation.

In addition, the image forming apparatus 10 sets the threshold value X2 to a value greater than the feature quantity X1. Accordingly, the image forming apparatus 10 can change the color determination result to a monochrome image even with respect to an image having a feature quantity close to that of a target image by changing the threshold value once. In addition, the image forming apparatus 10 the threshold value X6 to a value less than the feature quantity X5. Accordingly, the image forming apparatus 10 can change a color determination result to a color image even with respect to an image having a feature quantity close to that of a target image by changing the threshold value once.

In addition, the image forming apparatus 10 of an embodiment changes the threshold value using the distribution of the feature quantities derived in the past using the methods (4) and (8). In the method (4), the image forming apparatus 10 determines a new threshold value X2 to determine an image having a class value of CV2 as a monochrome image when the frequency of the class value CV2 adjacent to the class value CV1 of the target image is small. Accordingly, the image forming apparatus 10 can determine an image having a feature close to that of the target image as a monochrome image by changing the threshold value once. In the method (8), the image forming apparatus 10 determines a new threshold value X6 to determine an image having a class value of CV4 as a color image when the frequency of the class value CV4 adjacent to the class value CV3 of the target image is small. Accordingly, the image forming apparatus 10 can determine an image having a feature close to that of the target image as a color image by changing the threshold value once. As described above, the image forming apparatus 10 of the embodiment can change the color determination result even with respect to the image regarded as being close to the target image by changing the threshold value using the methods (4) and (8).

The above example embodiments can be modified as follows.

In an above embodiment, the processor 11 displays the screen SC1 on the touch panel 163 in Act 20 after the process of Act 19 of FIG. 3. However, the processor 11 may display the screen SC2 on the touch panel 163 after the process of Act 19. That is, the processor 11 may proceed to Act 25 of FIG. 4 after the process of Act 19. After the process of Act 19, whether the screen SC1 or the screen SC2 is displayed may be changed by settings.

The processor 11 may perform color determinations using a method different from the above examples. For example, the processor 11 may convert the color-likeness of the image to numerical values and determines that the image is to be handled as a color image if a numerical value is equal to or greater than the value of the variable V2. A numerical value indicating the color-likeness is an example of a feature quantity.

The image forming apparatus 10 of an above example uses a color feature quantity in which the degree of the color is increased as the value is increased. However, the image forming apparatus 10 may use a color feature quantity in which the degree of the color is increased as the value is decreased. In this case, the values of the related processes are reversed.

In the above examples, the image forming apparatus 10 performs color determination with respect to the image read by the scanner unit 17. However, the image forming apparatus 10 may instead or in addition perform the color determination with respect to an image transmitted by a PC or the like and received via the communication interface 15. In this case, the processor 11 acquires the image received by the communication interface 15. Accordingly, the processor 11 operates as an acquisition unit in cooperation with the communication interface 15. Alternatively, the image forming apparatus 10 may perform the color determination with respect to an image read from an auxiliary storage device 14. In this case, the processor 11 acquires the image read from the auxiliary storage device 14. Accordingly, the processor 11 operates as an acquisition unit in cooperation with the auxiliary storage device 14.

While certain embodiments in the invention have been described, these embodiments are presented by way of example only, and are not intended to limit the scope of the present disclosure. Indeed, the novel embodiments described herein can be performed in a variety of other forms; furthermore, various omissions, substitutions and changes can be made without departing from the spirit of the present disclosure. The embodiments and the modifications thereof are included in the range and the spirit of the present disclosure, and are included in the invention described in the claims and the equivalent scope thereof.

What is claimed is:

1. An image processing apparatus, comprising:
a processor configured to:
acquire an image; and designate whether the image is a color image or a monochrome image based on a comparison of a feature quantity of the image and a threshold value;
a storage device for storing the threshold value;
a display for displaying whether the image has been designated a color image or a monochrome image by the processor; and
an input device configured to receive user input for changing whether the image is designated a color image or a monochrome image, wherein
the processor is further configured to change the threshold value stored in the storage device to a new threshold value if the user input changes whether the image is designated a color image or a monochrome image, the new threshold value being calculated based on the feature quantity of the image.

2. The apparatus according to claim 1, wherein
the processor acquires a plurality of images,
designates each of the plurality of images as a color image or a monochrome image according the threshold value,
the display is configured to display the designation of a color image or a monochrome image for each of the plurality of images, and
the input device is configured to receive the user input for changing whether at least one image among the plurality of images is designated a color image or a monochrome image.

3. The apparatus according to claim 2, wherein the display is configured to display the plurality of images in an order of increasing or decreasing feature quantity.

4. The apparatus according to claim 2, wherein the processor is configured to use the new threshold value to re-designate each of the plurality of images as a color image or a monochrome image after the threshold value is changed according to the user input received by the input device.

5. The apparatus according to claim 1, wherein the processor acquires the image via a scanner.

6. The apparatus according to claim 1, wherein the processor acquires the image via a network interface.

7. The apparatus according to claim 1, wherein the processor acquires the image from the storage device.

8. The apparatus according to claim 1, further comprising:
a scanner for acquiring the image.

9. The apparatus according to claim 1, further comprising:
a network interface via which the processor acquires the image.

10. The apparatus according to claim 1, wherein the storage device is configured to store user identification numbers in association with the threshold value and a history file including past image analysis results of a user.

11. A multifunctional peripheral device, comprising:
a scanner for obtaining a document image;
a printer for printing color and monochrome images on recording media;
an operation panel for displaying information and receiving user inputs associated with operations of the scanner and the printer;
a storage device for storing, in association with a user ID, a color feature threshold value and a history file including previously determined color feature threshold values of the user associated with the user ID; and
a processor configured to:
set the user ID according to a log-in process;
acquire a plurality of page images;
designate each page image as a color image or a monochrome image based on analysis of a color feature quantity value of the page image and the color feature threshold value stored in the storage device in association with the user ID;
display the designation of a color image or a monochrome image for the plurality of page images on the operation panel;
receive user input, via the operation panel, for changing whether at least one page image among the plurality of page images is designated a color image or a monochrome image;
calculate a new color feature threshold value if the received user input changes whether at least one image among the plurality of page images is designated a color image or a monochrome image, the new color feature threshold value being calculated based on the color feature quantity value of the at least one image having a designation changed by the user input; and
store the new color feature threshold value in the storage unit in association with the user ID.

12. The multifunctional peripheral device according to claim 11, wherein the plurality of page images is obtained via the scanner.

13. The multifunctional peripheral device according to claim 11, further comprising:
a network interface, wherein
the plurality of page images is obtained via the network interface.

14. The multifunctional peripheral device according to claim 11, wherein the operation panel comprises a touch panel.

15. The multifunctional peripheral device according to claim 11, wherein the color feature quantity value is a ratio of a total number of determined color pixels in a page image to a total number of pixels in the page image.

16. The multifunctional peripheral device according to claim 15, wherein the processor is further configured to calculate the total number of determined color pixels in each page image.

17. An image processing method, comprising:
receiving a page image including a plurality of pixels;
calculating a color feature quantity value for the page image, the color feature quantity value corresponding to a ratio of a total number of determined color pixels in the plurality of pixels to a total number of pixels in the plurality of pixels;
designate whether the page image is a color image or a monochrome image based on the calculated color feature quantity value of the page image and a threshold color feature quantity value associated with a user ID;
displaying, on an operation panel, whether the page image is designated a color image or a monochrome image;
receiving, via the operation panel, a user input for changing whether the page image is designated a color image or a monochrome image; and
changing the threshold color feature quantity value associated with the user ID to a new threshold value if the user input is received for changing whether the page image is designated a color image or a monochrome image, the new threshold value being calculated based on the color feature quantity value for the page image.

18. The image processing method according to claim 17, wherein the page image is obtained by a scanner.

19. The image processing method according to claim 17, further comprising:
receiving a plurality of page images;
calculating the color feature quantity value for each page image in the plurality; and designating whether each page image in the plurality of page images is a color image or a monochrome image based on the calculated color feature value of the respective page image and the threshold color feature quantity value associated with the user ID.

20. The image processing method according to claim 17, wherein determination of whether each pixel is a color pixel is based on RGB levels of the pixel.

\* \* \* \* \*